United States Patent Office 2,945,870
Patented July 19, 1960

2,945,870
METHOD FOR PREPARING N-ACYL-p-AMINO PHENOLS

David W. Young, Homewood, Ill., assignor to Sinclair Refining Company, New York, N.Y., a corporation of Maine No Drawing. Filed Oct. 24, 1958, Ser. No. 769,297

4 Claims. (Cl. 260—404)

This invention relates to an improved method for preparing N-acyl-p-amino phenols. More particularly, this invention relates to a process for producing high yields of light colored N-acylated p-amino phenols.

In the past few years a new class of non-volatile antioxidants for petroleum products, greases, synthetic lubricants, plastic rubbers, resins, etc. has been developed. The materials may be called acylated p-amino phenols as a general class. The acyl-p-amino phenols, particularly the very low molecular weight members such as N-acetyl-p-amino phenol have also been found useful as a "short stop" in emulsion polymerization systems, for example, the formation of GR–S rubbers, polybutadiene, polyisoprene, etc. and as an analgesic additive in aspirin.

The acyl p-amino phenols are generally prepared by a condensation reaction which comprises heating a monocarboxylic acid or its anhydride in the presence of an entraining solvent such as benzene, toluene, xylene and the like, with para amino phenol. The solid reaction product is then dehydrated by evaporation. The present invention follows this general method of preparing N-acylated p-amino phenols but is directed toward the improvement of such condensation technique.

One of the major problems with the above preparation is the color noted in the resulting N-acylated p-amino phenol product. Whatever the cause, this coloration is particularly undesirable inasmuch as the N-acylated p-amino phenols are widely used in clear, colorless materials such as resins, plastics and the like and as analgesic additives in aspirins which require a high degree of purity. Accordingly, to eliminate the undesirable color, various methods of recrystallization, distillation and solvent extraction have been employed with varying degrees of success. But even where successful in producing a pure product such methods are time consuming and costly. It has also been proposed in Patent No. 2,799,692 to Croxall et al. to eliminate this undesirable color by carrying out the condensation of the reactants in accordance with the generally employed method but blanketing the reactants in an atmosphere of sulfur dioxide. Although this method produces a pure product, the yield obtained leaves much to be desired.

It has now been found that light colored N-acylated p-amino phenols can be obtained in unexpectedly high yields by effecting the condensation of the p-amino phenol and a mono-carboxylic acid in an atmosphere of sulfur dioxide and in the presence of a catalyst selected from the group consisting of boron trioxide ($B_2O_3$) and metaboric acid of 176° C. melting point. As will be illustrated below, use of either of the above catalysts in a condensation method wherein the p-amino phenol and acid reactants are blanketed in an atmosphere of sulfur dioxide gas produces surprising yield advantages over a similar condensation method disclosed in the Croxall et al. Patent No. 2,799,692 wherein boric acid is employed as the catalyst.

The boron trioxide and metaboric acid catalysts of the present invention are commercially available and can be obtained, for example, from the United States Borax and Chemical Corporation. Boron trioxide is an amorphous, colorless, anhydrous solid made by heating boric acid. The ordinary vitreous form of boron trioxide has no definite melting point. It begins to soften at about 325° C. (617° F.) and is fully fluid and pourable at about 500° C. (932° F.). It has a molecular weight of 69.6, a specific gravity at 12° C. of 1.795 and a heat of solution of 188.7 (B.t.u. per pound). Although boron trioxide can be employed in the present invention in its lump and various mesh forms, it is preferred to use 100 mesh boron trioxide.

Metaboric acid is generally obtained from boron trioxide. There are three crystalline forms of metaboric acid available; one melting at 176° C., another melting at 201° C. and the third melting at 236° C. Of the three forms, the metaboric acid form melting at 176° C. has been found to give the most advantageous yield of light-colored N-acyl para-amino phenol. This form of metaboric acid is easily formed by quickly cooling molten boron trioxide. The metaboric acid melting at 201° C. is the most stable form and is obtained by remelting the metaboric acid form melting at 176° C. and cooling slowly. Metaboric acid of 236° C. melting point is formed at high temperatures, and is very insoluble. The preparation of the three forms of metaboric acid is described in Kemp, P. H., The Chemistry of Borates, part I, chapter 3, pages 9 to 11, Borax Consolidated Limited, London (1956). The boron trioxide and metaboric acid catalysts of the present invention are utilized in catalytic amounts of up to about 5 weight percent based on the combined weight of the reactants and entraining solvents and preferably in an amount of about 1 to 2 weight percent.

In the practice of this invention, as in the prior art, the monocarboxylic acids having 2 to 21, preferably 12 to 18, carbon atoms are generally employed as the acid reactant. When the higher fatty acids containing upwards of 4 carbon atoms are used, as the acid reactant, the corresponding N-acylated p-amino phenols possess greater solubility and therefore wider application as antioxidant additives in the various organic compositions that tend to gradually oxidize in storage. However, it will be appreciated that the exact nature of the acyl substituent does not effect the condensation of the acid with the amine. Oxo-acids and branched acids are less desirable from a reaction rate standpoint. In selecting the p-amino phenol substituent either the unsubstituted p-amino phenol or the nuclear substituted p-amino phenols are suitable reactants within the scope of this invention.

The following examples will illustrate the novel effects of the catalysts of the present invention.

Example I below was run under the same conditions as given in Example I of Patent No. 2,799,692. All the results listed in Example I of the patent were checked with the results of the run and were found to be accurate.

Example I

A two liter resin flask was equipped with an anchor-type glass agitator, a Dean-Starke water trap carrying a condenser, a thermometer and a gas inlet tube for maintaining an atmosphere of $SO_2$ above the surface of the reaction mixture. The flask was charged with 109 g. (1.0 mole) of p-amino phenol, 200 g. of coconut fatty acid which was a mixture of $C_{10}$, $C_{12}$, $C_{14}$ and $C_{16}$ fatty acids with lauric ($C_{12}$) acid predominating (the mixture having an acid number of 246.0 and a molecular weight of 228.0), 72 g. of toluene and 3.8 g. of powdered boric acid catalyst. The leg of the Dean-Starke trap was filled with 20 ml. of toluene and heating and agitation were started. A slow stream of sulfur dioxide was passed over the surface of the reactants. The charge was heated at 135 to 140° C., water being removed fairly rapidly at the beginning and more slowly as the reaction proceeded. A total of 18.5 ml. of water was collected in six hours.

The toluene was distilled at reduced pressure (15–20 mm.) and a maximum final temperature 145° C. The residual melt was cooled slightly, and dissolved by adding 500 g. of 88% isopropanol. This solution was treated with 10 g. of activated powdered charcoal for 2½ hours at reflux; and filtered while still hot. An atmosphere of $SO_2$ was maintained throughout these operations. The charcoal coke was washed twice with 44 g. portions of hot 100% isopropanol. The filtrate and washings were transferred to a clean two liter resin flask and diluted with 200 ml. of hot water. With agitation and gradual cooling under a continuous atmosphere of $SO_2$, the product was allowed to precipitate. At 58° C., the dropwise addition of 532 ml. of water was begun, being completed in about one hour. Cooling was applied by means of an ice-bath, the temperature of the mass falling to 15° C.

The supply of sulfur dioxide was then shut off and the product collected on a 5-inch centrifuge and washed with 50% by volume of cold aqueous isopropanol. The material was dried to constant weight in an oven at 60–75°. There was obtained 242 g. (83.2% of theory based on p-amino phenol), of a white powder; melting point 124 to 125° C.

*Example II*

Example I was conducted except that 3.8 grams of metaboric acid ($HBO_2$) of 176° C. melting point was employed as the catalyst instead of 3.8 grams of boric acid.

The result was a yield of white powder of 98.7 percent of theory based on p-amino phenol. The speed of the reaction was about 30% faster than the reaction in Example I. No ammonia was given off as a by-product during the reaction between the acid and p-amino phenol and the filtration rate on the product was rapid.

*Example III*

Example II was conducted except that the form of metaboric acid having a melting point of 201° C. was used as a catalyst. This form of metaboric acid gave a yield of 86.2 percent of theory based on p-amino phenol. The speed of reaction was about 20% faster than Example I.

*Example IV*

Example II was again conducted but using as a catalyst the form of metaboric acid having a melting point of 236° C. This form of catalyst gave a yield of 84.6 percent of theory based on p-amino phenol. The reaction rate was about 5% faster than Example I.

*Example V*

Example I was conducted using 3.8 grams of 100 mesh anhydrous boron oxide ($B_2O_3$) as a catalyst instead of 3.8 grams of boric acid. A yield of white powder of 98.2 percent of theory based on p-amino phenol was obtained.

A comparison of the results of Examples I to V shows that surprisingly higher yields of N-acyl p-amino phenol are obtained at a faster reaction rate by using either boron trioxide or metaboric acid of 176° C. melting point as a catalyst in the condensation method of Example I than by using the more conventional boric acid. Also shown by the results of Examples III and IV is the fact that use of the metaboric acid with the monotropic form melting at 176° C. as a catalyst produces higher yields than either of the other two forms of metaboric acid.

I claim:

1. In the N-acylation of a p-amino phenol by condensation with a monocarboxylic acid of 2 to 21 carbon atoms, the improvement which comprises carrying out the condensation reaction in an atmosphere of sulfur dioxide and in the presence of a catalyst selected from the group consisting of boron trioxide and metaboric acid of 176° C. melting point.

2. The process of claim 1 wherein the monocarboxylic acid contains 12 to 18 carbon atoms.

3. The process of claim 1 wherein the catalyst is boron trioxide.

4. In the N-acylation of a p-amino phenol by condensation with a monocarboxylic acid of 2 to 21 carbon atoms, the improvement which comprises carrying out the condensation reaction in an atmosphere of sulfur dioxide and in the presence of a catalyst selected from the group consisting of boron trioxide and metaboric acid of 176° C. melting point, heating said reaction mixture to remove the water of condensation, cooling to crystallize the N-acyl-p-amino phenol and washing the resulting crystalline product, said heating, cooling and washing being done while maintaining said atmosphere of sulfur dioxide.

References Cited in the file of this patent

UNITED STATES PATENTS

| | | |
|---|---|---|
| 2,711,415 | Cottle et al. | June 21, 1955 |
| 2,799,692 | Croxall et al. | July 16, 1957 |